(12) United States Patent
Petersen et al.

(10) Patent No.: US 6,852,175 B2
(45) Date of Patent: Feb. 8, 2005

(54) HIGH STRENGTH MARINE STRUCTURES

(75) Inventors: Clifford W. Petersen, Missouri City, TX (US); Moses Minta, Sugar Land, TX (US); Ann T. Leger, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 46 days.

(21) Appl. No.: 10/303,607

(22) Filed: Nov. 25, 2002

(65) Prior Publication Data

US 2003/0098098 A1 May 29, 2003

Related U.S. Application Data (60) Provisional application No. 60/333,584, filed on Nov. 27, 2001, and provisional application No. 60/342,204, filed on Dec. 19, 2001.

(51) Int. Cl.[7] .......................... C22C 38/00; C22C 38/08
(52) U.S. Cl. ...................................... 148/336; 148/320
(58) Field of Search ................................ 148/320, 336

(56) References Cited

U.S. PATENT DOCUMENTS

| | | | | |
|---|---|---|---|---|
| 2,004,074 A | 6/1935 | Kiley | .......................... | 220/85 |
| 2,763,397 A | 9/1956 | Rice | .......................... | 220/85 |
| 2,795,937 A | 6/1957 | Sattler et al. | ..................... | 62/1 |
| 2,940,268 A | 6/1960 | Morrison | ........................ | 62/7 |
| 3,097,294 A | 7/1963 | Kubli et al. | ................. | 219/145 |
| 3,232,725 A | 2/1966 | Secord et al. | .................. | 48/190 |
| 3,298,805 A | 1/1967 | Secord et al. | .................. | 48/190 |
| 3,477,509 A | 11/1969 | Arendt | ........................ | 166/252 |
| 3,535,210 A | 10/1970 | Linde et al. | ................... | 203/11 |
| 3,565,201 A | 2/1971 | Petsinger | ...................... | 180/54 |
| 3,745,322 A | 7/1973 | Ito et al. | ...................... | 219/137 |
| 3,773,500 A | 11/1973 | Kanazawa et al. | ........ | 75/123 B |
| 3,853,611 A | 12/1974 | Godai et al. | ................. | 117/205 |
| 3,864,918 A | 2/1975 | Lorenz | .......................... | 60/651 |
| 3,931,908 A | 1/1976 | Cheyney | ....................... | 220/71 |
| 3,967,465 A | 7/1976 | Asselman et al. | .............. | 62/48 |
| 3,986,340 A | 10/1976 | Bivins, Jr. | ...................... | 62/53 |
| 3,990,256 A | 11/1976 | May et al. | ...................... | 62/53 |
| 4,024,720 A | 5/1977 | Dimentberg et al. | ............ | 62/55 |
| 4,033,135 A | 7/1977 | Mandrin | ....................... | 60/648 |

(List continued on next page.)

FOREIGN PATENT DOCUMENTS

| | | | | |
|---|---|---|---|---|
| CA | 988751 A | 5/1976 | | |
| JP | 402209422 A | 8/1990 | | |
| JP | 402209422 | * | 8/1990 | ................. 148/653 |

OTHER PUBLICATIONS

English abstract, Canadian patent 988751, dated May 11, 1976.*

International Search Report mailed Mar. 25, 2004, for International Application No. PCT/US02/38087, filed Nov. 26, 2002, 4 pages.

*Primary Examiner*—Deborah Yee (57) ABSTRACT

Marine structures are provided that are constructed from ultra-high strength, low alloy steels containing less than 2.5 wt % nickel and having a tensile strength greater than 900 MPa (130 ksi). A primary benefit is that the marine structures of this invention have a cost per unit strength substantially lower than that of currently available marine structures.

3 Claims, 5 Drawing Sheets

U.S. PATENT DOCUMENTS

| | | | |
|---|---|---|---|
| 4,068,113 A | 1/1978 | Godai et al. | 219/146.23 |
| 4,162,158 A | 7/1979 | Hwang et al. | 75/124 |
| 4,182,254 A | 1/1980 | Secord | 114/74 A |
| 4,184,898 A | 1/1980 | Ouchi et al. | 148/12 F |
| 4,210,445 A | 7/1980 | Kasamatsu et al. | 75/124 |
| 4,257,808 A | 3/1981 | Morris, Jr. et al. | 75/123 N |
| 4,259,846 A | 4/1981 | Rudolphi et al. | 62/48 |
| 4,266,958 A | 5/1981 | Cummings | 62/20 |
| 4,300,598 A | 11/1981 | Royer et al. | 138/177 |
| 4,315,407 A | 2/1982 | Creed et al. | 62/53 |
| 4,374,478 A | 2/1983 | Secord et al. | 73/863.31 |
| 4,459,929 A | 7/1984 | Ffooks | 114/74 A |
| 4,464,209 A | 8/1984 | Taira et al. | 148/36 |
| 4,572,748 A | 2/1986 | Suga et al. | 148/12 F |
| 4,687,525 A | 8/1987 | Biniasz et al. | 148/336 |
| 4,776,900 A | 10/1988 | Yano et al. | 148/12 R |
| 4,878,955 A | 11/1989 | Hoshino et al. | 148/12 E |
| 5,118,221 A | 6/1992 | Copple | 405/224.2 |
| 5,127,230 A | 7/1992 | Neeser et al. | 62/7 |
| 5,183,198 A | 2/1993 | Tamehiro et al. | 228/186 |
| 5,183,633 A | 2/1993 | Thierry et al. | 420/92 |
| 5,199,266 A | 4/1993 | Johansen | 62/8 |
| 5,213,634 A | 5/1993 | DeArdo et al. | 148/334 |
| 5,228,295 A | 7/1993 | Gustafson | 62/7 |
| 5,287,987 A | 2/1994 | Gaiser | 220/589 |
| 5,325,673 A | 7/1994 | Durr et al. | 62/23 |
| 5,327,730 A | 7/1994 | Myers et al. | 62/9 |
| 5,330,031 A | 7/1994 | Hill et al. | 180/271 |
| 5,373,700 A | 12/1994 | McIntosh | 62/48.1 |
| 5,421,162 A | 6/1995 | Gustafson et al. | 62/7 |
| 5,437,800 A | 8/1995 | White-Stevens | 210/787 |
| 5,441,234 A | 8/1995 | White et al. | 251/144 |
| 5,443,330 A | 8/1995 | Copple | 405/224.2 |
| 5,443,578 A | 8/1995 | Davis, Jr. | 280/834 |
| 5,447,391 A | 9/1995 | Gallaher et al. | 405/203 |
| 5,454,883 A | 10/1995 | Yoshie et al. | 148/320 |
| 5,458,258 A | 10/1995 | White et al. | 220/589 |
| 5,484,098 A | 1/1996 | Anttila et al. | 228/184 |
| 5,509,977 A | 4/1996 | Yano et al. | 148/328 |
| 5,529,089 A | 6/1996 | Hicks et al. | 137/382 |
| 5,531,842 A | 7/1996 | Koo et al. | 148/654 |
| 5,545,269 A | 8/1996 | Koo et al. | 148/654 |
| 5,545,270 A | 8/1996 | Koo et al. | 148/654 |
| 5,554,233 A | 9/1996 | Heitmann et al. | 148/330 |
| 5,566,712 A | 10/1996 | White et al. | 137/587 |
| 5,582,218 A | 12/1996 | Beale | 141/3 |
| 5,590,535 A | 1/1997 | Rhoades | 62/50.2 |
| 5,603,360 A | 2/1997 | Teel | 141/21 |
| 5,611,316 A | 3/1997 | Oshima et al. | 123/494 |
| 5,634,988 A | 6/1997 | Kurebayashi et al. | 148/320 |
| 5,653,826 A | 8/1997 | Koo et al. | 148/328 |
| 5,676,180 A | 10/1997 | Teel | 141/18 |
| 5,678,411 A | 10/1997 | Matsumura et al. | 62/50.3 |
| 5,683,206 A | 11/1997 | Copple | 405/224.2 |
| 5,755,895 A * | 5/1998 | Tamehiro et al. | 148/336 |
| 5,762,119 A | 6/1998 | Platz et al. | 141/231 |
| 5,785,924 A | 7/1998 | Beguinot et al. | 420/63 |
| 5,787,920 A | 8/1998 | Krasnov | 137/255 |
| 5,798,004 A | 8/1998 | Tamehiro et al. | 148/336 |
| 5,876,521 A | 3/1999 | Koo et al. | 148/328 |
| 5,878,814 A | 3/1999 | Breivik et al. | 166/267 |
| 5,884,488 A | 3/1999 | Gram et al. | 62/50.6 |
| 5,887,567 A | 3/1999 | White et al. | 123/294 |
| 5,900,075 A | 5/1999 | Koo et al. | 148/328 |
| 5,908,141 A | 6/1999 | Teel | 222/3 |
| 5,919,415 A | 7/1999 | Pichard | 420/106 |
| 5,950,453 A | 9/1999 | Bowen et al. | 62/612 |
| 5,980,159 A | 11/1999 | Kazim | 405/200 |
| 6,047,747 A | 4/2000 | Bowen et al. | 141/231 |
| 6,058,713 A | 5/2000 | Bowen et al. | 62/7 |
| 6,066,212 A | 5/2000 | Koo et al. | 148/336 |
| 6,085,528 A * | 7/2000 | Woodall et al. | 62/45.1 |
| 6,114,656 A | 9/2000 | Fairchild | 219/137 |
| 6,159,312 A | 12/2000 | Koo et al. | 148/336 |
| 6,203,631 B1 | 3/2001 | Bowen et al. | 148/336 |
| 6,212,891 B1 | 4/2001 | Minta et al. | 62/50.7 |
| 6,224,689 B1 | 5/2001 | Koo et al. | 148/320 |
| 6,228,183 B1 | 5/2001 | Bangaru et al. | 148/320 |
| 6,245,290 B1 | 6/2001 | Koo et al. | 420/119 |
| 6,248,191 B1 | 6/2001 | Luton et al. | 148/654 |
| 6,251,198 B1 | 6/2001 | Koo et al. | 148/332 |
| 6,254,698 B1 | 7/2001 | Koo et al. | 148/336 |
| 6,264,760 B1 | 7/2001 | Tamehiro et al. | 148/336 |
| 6,336,583 B1 | 1/2002 | Wang et al. | 228/175 |

* cited by examiner

HIGH STRENGTH MARINE STRUCTURES

This application claims the benefit of U.S. Provisional Application No. 60/333,584, filed Nov. 27, 2001, and of U.S. Provisional Application No. 60/342,204, filed Dec. 19, 2001.

FIELD OF THE INVENTION

This invention relates to marine structures constructed from ultra-high strength, low alloy steels and having a cost per unit strength substantially lower than that of currently available marine structures. More particularly, this invention relates to marine structures that are constructed from ultra-high strength, low alloy steels containing less than 2.5 wt % nickel and having a tensile strength greater than 900 MPa (130 ksi).

BACKGROUND OF THE INVENTION

Various terms are defined in the following specification. For convenience, a Glossary of terms is provided herein, immediately preceding the claims.

Frequently there is a need for marine structures that have high strength. For example, offshore platforms for production of hydrocarbons, such as compliant pile towers and deep draft caisson vessels, must have adequate strength to support processing equipment of substantial weight. Similarly, the processing equipment must have adequate strength to contain the hydrocarbons and/or other fluids used during the processing. Other marine structures that require strength, to name a few, are ship hulls, submarine hulls, marine vessel mooring chains, caissons, buoys, bridges, subsea transport lines for fluids, dams, seawalls, and retaining walls.

Commercially available carbon steels with low to moderate strength (35–50 ksi yield strength) are traditionally used to construct marine structures. In certain cases, commercially available nickel-containing steels (3½ wt % Ni to 9 wt % Ni), aluminum (Al-5083 or Al-5085), or stainless steel are used. Also, specialty materials such as titanium alloys and special epoxy-impregnated woven fiberglass composites are sometimes used. However, marine structures constructed from these materials often have increased wall thicknesses to provide the required strength. This adds weight to the marine structures that must be supported and/or transported, often at significant added cost to a project. The added cost for support and transport of the marine structures combined with the increased cost of the material for construction tends to decrease the economic attractiveness of projects.

Many marine structures must also have adequate fracture toughness to resist fracture initiation and cracking. Arctic environments, to which marine structures are often subjected, tend to make obtaining construction materials having the required combinations of strength and fracture toughness more difficult. For example, an offshore platform for production of hydrocarbons may be subject to arctic environments, i.e., temperatures down to −40° C. (−40° F.).

Nickel-containing steels conventionally used for structural applications that may be subjected to cold temperatures, e.g., steels with nickel contents of greater than about 3 wt %, have good fracture toughness, but also have relatively low tensile strengths. Typically, commercially available 3.5 wt % Ni, 5.5 wt % Ni, and 9 wt % Ni steels have yield strengths of up to about 275 MPa (40 ksi), 450 MPa (65 ksi), and 620 MPa (90 ksi), respectively, and corresponding tensile strengths of up to about 485 MPa (70 ksi), 620 MPa (90 ksi), and 690 MPa (100 ksi), respectively. In order to achieve combined strength and cold temperature fracture toughness, these steels generally undergo costly processing, e.g., double annealing treatment. In certain applications, industry currently uses these commercial nickel-containing steels because of their good fracture toughness at low temperatures, but must design around their relatively low tensile strengths. The designs generally require excessive steel thicknesses for load-bearing applications. Thus, use of these nickel-containing steels in load-bearing applications tends to be expensive due to the high cost of the steel combined with the steel thicknesses required. Additionally, not all of these steels retain the required cold temperature fracture toughness in the heat affected zone (HAZ) when welded.

A need exists for marine structures suitable for economically producing and processing hydrocarbons for commercial use, particularly such marine structures that have a cost per unit strength substantially lower than that of currently available marine structures. In some cases, a need exists for such marine structures that also have adequate fracture toughness in both the base plate and the HAZ for use in arctic environments, i.e., at temperatures down to −40° C. (−40° F.). Additionally, other such marine structures suitable for use in arctic environments are needed.

Consequently, an object of this invention is to provide marine structures suitable for economically producing and processing hydrocarbons for commercial use. Another object of the present invention is to provide such marine structures having a cost per unit strength substantially lower than that of currently available marine structures. A further object of this invention is to provide such marine structures having the required combinations of strength and fracture toughness for use in arctic environments. Other objects will be made apparent by the following description of the invention.

SUMMARY OF THE INVENTION

Consistent with the above-stated objects of this invention, marine structures and facilities suitable for economically producing and processing hydrocarbons for commercial use are provided. The marine structures of this invention have a cost per unit strength substantially lower than that of currently available marine structures and are constructed from materials comprising an ultra-high strength, low alloy steel containing less than 2.5 wt % nickel. The steel has an ultra-high strength, e.g., tensile strength (see Glossary) greater than 900 MPa (130 ksi). Other marine structures constructed from materials comprising such ultra-high strength, low alloy steels are also provided.

These ultra-high strength, low alloy steels can be advantageously used, for example, in the construction of offshore platforms for production of hydrocarbons, such as deep draft caisson vessels. Additionally, these ultra-high strength, low alloy steels can be used for construction of processing equipment used on offshore platforms for containing hydrocarbons and/or other fluids used during the processing. Other marine structures, such as ship hulls, submarine hulls, marine vessel mooring chains, caissons, buoys, bridges, subsea transport lines for fluids, dams, seawalls, and retaining walls, can also be constructed according to this invention. Marine structures of this invention generally have less overall weight with concomitant savings in transport, handling, and substructure requirements, as compared to current commercial marine structures, and can therefore substantially increase the economic attractiveness of a project. An added benefit of this invention is that marine structures according to this invention have adequate fracture toughness for use in arctic environments.

DESCRIPTION OF THE DRAWINGS

The advantages of the present invention will be better understood by referring to the following detailed description and the attached drawings in which.

While the invention will be described in connection with its preferred embodiments, it will be understood that the invention is not limited thereto. On the contrary, the invention is intended to cover all alternatives, modifications, and equivalents which may be included within the spirit and scope of the present disclosure, as defined by the appended claims.

DETAILED DESCRIPTION OF THE INVENTION

The present invention relates to new marine structures having a cost per unit strength substantially lower than that of currently available marine structures. The marine structures of this invention are constructed from materials comprising an ultra-high strength, low alloy steel containing less than 2.5 wt % nickel, preferably less than about 2.0 wt % nickel, and more preferably less than about 1.0 wt % nickel. Preferably, the steel contains at least about 0.1 wt % nickel, and more preferably at least about 0.2 wt % nickel. The steel has an ultra-high strength, e.g., tensile strength (as defined herein) greater than 900 MPa (130 ksi). Preferably, the ultra-high strength, low alloy steel has adequate fracture toughness in the base plate, and in the heat affected zone (HAZ) when welded, for use in arctic environments, i.e., at temperatures down to −40° C. (−40° F.).

A container is provided for use on an offshore structure that facilitates the production of hydrocarbons, said container (i) being suitable for containing a fluid used in either the production or processing of said hydrocarbons and (ii) having been constructed from materials comprising an ultra-high strength, low alloy steel containing less than 2.5 wt % nickel and having a tensile strength of at least about 900 MPa (130 ksi). A method of producing hydrocarbons is provided, said method comprising the step of using an offshore structure to facilitate production of said hydrocarbons, wherein said offshore structure supports at least one container suitable for containing a fluid used in either the production or processing of said hydrocarbons, said container having been constructed from materials comprising an ultra-high strength, low alloy steel containing less than 2.5 wt % nickel and having a tensile strength of at least about 900 MPa (130 ksi). A method of reducing the weight of an offshore structure that includes at least one container suitable for containing a fluid used in either the production or processing of hydrocarbons is provided, said method comprising the step of replacing said at least one container with a lighter-weight container suitable for containing said fluid, said lighter-weight container having been constructed from materials comprising an ultra-high strength, low alloy steel containing less than 2.5 wt % nickel and having a tensile strength of at least about 900 MPa (130 ksi). A method of constructing an offshore structure is provided, said method comprising the step of including at least one container suitable for containing a fluid used in either the production or processing of hydrocarbons, said at least one container having been constructed from materials comprising an ultra-high strength, low alloy steel containing less than 2.5 wt % nickel and having a tensile strength of at least about 900 MPa (130 ksi). A method of producing hydrocarbons is provided, said method comprising the step of using an offshore structure to facilitate production of said hydrocarbons, wherein said offshore structure comprises at least one structural member, said at least one structural member having been constructed from materials comprising an ultra-high strength, low alloy steel containing less than 2.5 wt % nickel and having a tensile strength of at least about 900 MPa (130 ksi). Such structural members can include, without hereby limiting this invention, I-beam, tubular, channel, box, box beam, box girders, angle, bracket, L-shaped member, T-shaped member, gusset, plate, decking, blast wall, and other structural shapes, as will be familiar to those skilled in the art. A method of producing hydrocarbons is provided, said method comprising the step of using an offshore structure to facilitate production of said hydrocarbons, wherein said offshore structure comprises at least one structural member selected from the group consisting of an I-beam, a tubular, a channel, a box, a box beam, a box girder, an angle, a bracket, an L-shaped member, a T-shaped member, a gusset, a plate, decking, and a blast wall, said at least one structural member having been constructed from materials comprising an ultra-high strength, low alloy steel containing less than 2.5 wt % nickel and having a tensile strength of at least about 900 MPa (130 ksi). A method of reducing the weight of an offshore structure that includes at least one structural member is provided, said method comprising the step of replacing said at least one structural member with a lighter-weight structural member, said lighter-weight structural member having been constructed from materials comprising an ultra-high strength, low alloy steel containing less than 2.5 wt % nickel and having a tensile strength of at least about 900 MPa (130 ksi). A method of reducing the weight of an offshore structure that includes at least one structural member selected from the group consisting of an I-beam, a tubular, a channel, a box, a box beam, a box girder, an angle, a bracket, an L-shaped member, a T-shaped member, a gusset, a plate, decking, and a blast wall, is provided, said method comprising the step of replacing said at least one structural member with a lighter-weight structural member, said lighter-weight structural member having been constructed from materials comprising an ultra-high strength, low alloy steel containing less than 2.5 wt % nickel and having a tensile strength of at least about 900 MPa (130 ksi). A method of constructing an offshore structure is provided, said method comprising the step of including at least one structural member, said at least one structural member having been constructed from materials comprising an ultra-high strength, low alloy steel containing less than 2.5 wt % nickel and having a tensile strength of at least about 900 MPa (130 ksi). A method of constructing an offshore structure is provided, said method comprising the step of including at least one structural member selected from the group consisting of an I-beam, a tubular, a channel, a box, a box beam, a box girder, an angle, a bracket, an L-shaped member, a T-shaped member, a gusset, a plate, decking, and a blast wall, said at least one structural member having been constructed from materials comprising an ultra-high strength, low alloy steel containing less than 2.5 wt % nickel and having a tensile strength of at least about 900 MPa (130 ksi). A method of constructing a ship is provided, said method comprising the step of including at least one structural member, said at least one structural member having been constructed from materials comprising an ultra-high strength, low alloy steel containing less than 2.5 wt % nickel and having a tensile strength of at least about 900 MPa (130 ksi). A method of constructing a ship that includes a hull is provided, said method comprising the step of constructing said hull from materials comprising an ultra-high strength, low alloy steel containing less than 2.5 wt % nickel and having a tensile strength of at least about 900 MPa (130 ksi). A method of reducing the weight of a ship that includes at least one structural member is provided, said method comprising the step of replacing said at least one structural member with a lighter-weight structural member, said lighter-weight structural member having been constructed from materials comprising an ultra-high strength, low alloy steel containing less than 2.5 wt % nickel and having a tensile strength of at least about 900 MPa (130 ksi). A method of reducing the weight of a ship that includes a hull is provided, said method comprising the step of replacing said hull with a lighter-weight hull, said lighter-weight hull having been constructed from materials comprising an ultra-high strength, low alloy steel containing less than 2.5 wt % nickel and having a tensile strength of at least about 900 MPa (130 ksi). A method of constructing a submarine vessel is provided, said method comprising the step of constructing said vessel from materials comprising an ultra-high strength, low alloy steel containing less than 2.5 wt % nickel and having a tensile strength of at least about 900 MPa (130 ksi). A method of reducing the weight of a submarine vessel that includes at least one structural member, said method comprising the step of replacing said at least one structural member with a lighter-weight structural member, said lighter-weight structural member having been constructed from materials comprising an ultra-high strength, low alloy steel containing less than 2.5 wt % nickel and having a tensile strength of at least about 900 MPa (130 ksi). A method of reducing the weight of a submarine vessel that includes a hull, said method comprising the step of replacing said hull with a lighter-weight hull, said lighter-weight hull having been constructed from materials comprising an ultra-high strength, low alloy steel containing less than 2.5 wt % nickel and having a tensile strength of at least about 900 MPa (130 ksi).

Figure 1:
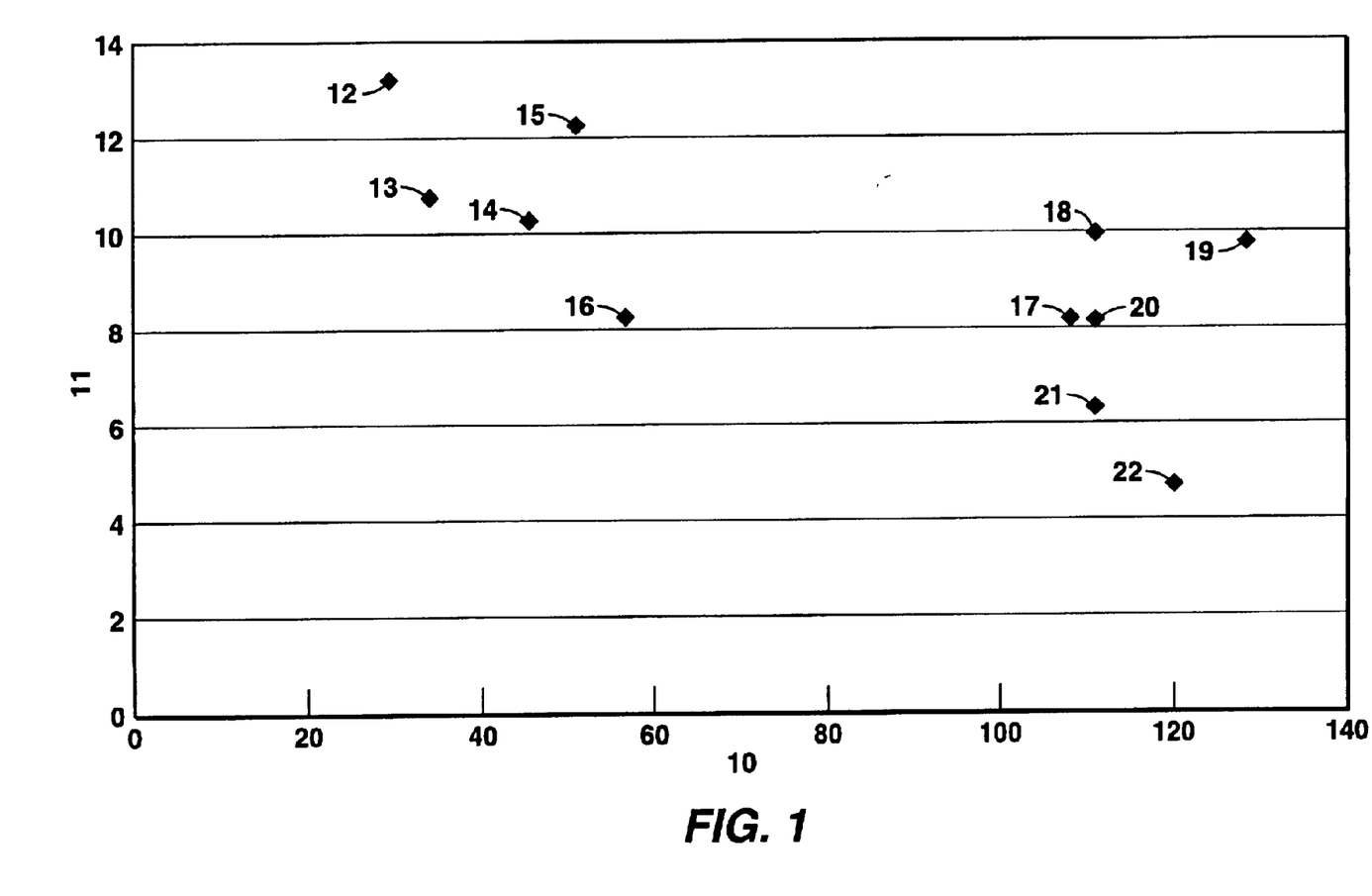
FIG. 1 is a chart illustrating the cost per unit strength as a function of yield strength for several commercially available steels and for an ultra-high strength, low alloy steel useful in the current invention.

FIG. 1 illustrates cost per unit strength (axis 11) as a function of yield strength (axis 10) for several commercially available steels and for an ultra-high strength, low alloy steel useful in the current invention. Assuming the fabrication techniques are comparable using the different steels, using ultra-high strength, low alloy steels would be considerably less costly than using the commercially available steels for constructing marine structures. Steel 12 is a commercially available normalized carbon manganese steel used primarily for pressure vessel construction, steels 13, 14, 15, and 16 are commercially available normalized carbon manganese steels typically used for ship construction, and steels 17, 18, 19, 20, and 21 are commercially available quench and tempered low alloy steels. Steel 22 is an ultra-high strength, low alloy steel with excellent low temperature toughness suitable for use in this invention, as described herein.

Steels for Construction of Marine Structures

Any ultra-high strength, low alloy steel containing less than 2.5 wt % nickel and having a tensile strength greater than 900 MPa (130 ksi) may be used for constructing the marine structural members and other components of systems of this invention. An example steel for use in the present invention, without thereby limiting the invention, is a weldable, ultra-high strength, low alloy steel containing less than 2.5 wt % nickel and having a tensile strength greater than 900 MPa (130 ksi). Another example steel for use in the present invention, without thereby limiting the invention, is a weldable, ultra-high strength, low alloy steel containing less than about 1 wt % nickel and having a tensile strength greater than 900 MPa (130 ksi). Preferably these example steels have adequate fracture toughness at temperatures down to −40° C. (−40° F.) in both the base plate and in the HAZ when welded.

Recent advances in steel making technology have made possible the manufacture of new, ultra-high strength, low alloy steels with excellent low temperature toughness. These ultra-high strength, low alloy steels also have improved toughness in both the base steel and in the heat affected zone (HAZ) when welded over standard commercially available high strength, low alloy steels. The improved steels are described in U.S. Pat. No. 6,245,290 entitled "HIGH-TENSILE-STRENGTH STEEL AND METHOD OF MANUFACTURING THE SAME", and in corresponding International Publication Number WO 98/38345; in U.S. Pat. No. 6,228,183 entitled "ULTRA HIGH STRENGTH, WELDABLE, BORON-CONTAINING STEELS WITH SUPERIOR TOUGHNESS", and in corresponding International Publication Number WO 99/05336; in U.S. Pat. No. 6,224,689 entitled "ULTRA-HIGH STRENGTH, WELDABLE, ESSENTIALLY BORON-FREE STEELS WITH SUPERIOR TOUGHNESS", and in corresponding International Publication WO 99/05334; in U.S. Pat. No. 6,248,191 entitled "METHOD FOR PRODUCING ULTRA-HIGH STRENGTH, WELDABLE STEELS WITH SUPERIOR TOUGHNESS", and in corresponding International Publication WO 99/05328; and in U.S. Pat. No. 6,264,760 entitled "ULTRA-HIGH STRENGTH, WELDABLE STEELS WITH EXCELLENT ULTRA-LOW TEMPERATURE TOUGHNESS", and in corresponding International Publication WO 99/05335 (collectively, the "Steel Patent Applications").

The new steels described in the Steel Patent Applications, and further described in the example below, are especially suitable for constructing the marine structural members and other components of this invention in that the steels have the following characteristics: (i) tensile strength greater than 900 MPa (130 ksi), more preferably greater than about 930 MPa (135 ksi); (ii) good weldability; (iii) substantially uniform microstructure; and (iv) adequate fracture toughness for use at temperatures down to −40° C. (−40° F.). The steels preferably have these properties for steel plate thicknesses of up to about 2.5 cm (1 inch) and greater Other suitable steels are described in International Publication Number WO 99/32672, entitled "ULTRA-HIGH STRENGTH STEELS WITH EXCELLENT CRYOGENIC TEMPERATURE TOUGHNESS"; in U.S. Pat. No. 6,251,198 and International Publication Number WO 99/32670, entitled "ULTRA-HIGH STRENGTH AUSAGED STEELS WITH EXCELLENT CRYOGENIC TEMPERATURE TOUGHNESS"; in U.S. Pat. No. 6,066,212 and International Publication Number WO 99/32671, entitled "ULTRA-HIGH STRENGTH DUAL PHASE STEELS WITH EXCELLENT CRYOGENIC TEMPERATURE TOUGHNESS"; in PCT International Application Number PCT/US99/29802, entitled "ULTRA-HIGH STRENGTH STEELS WITH EXCELLENT CRYOGENIC TEMPERATURE TOUGHNESS"; in U.S. Pat. No. 6,254,698 and PCT International Application Number PCT/US99/30055, entitled "ULTRA-HIGH STRENGTH AUSAGED STEELS WITH EXCELLENT CRYOGENIC TEMPERATURE TOUGHNESS"; and in U.S. Pat. No. 6,159,312 and PCT International Application Number PCT/US99/29804, entitled "ULTRA-HIGH STRENGTH TRIPLE PHASE STEELS WITH EXCELLENT CRYOGENIC TEMPERATURE TOUGHNESS" (collectively, the "Additional Steel Patents and Patent Applications"). The steels described in the Additional Steel Patents and Patent Applications are especially suitable for cold temperature applications, such as in arctic environments, in that the steels have the following characteristics: (i) DBTT lower than about −73° C. (−100° F.) in the base steel and in the weld heat-affected zone (HAZ), (ii) tensile strength greater than about 830 MPa (120 ksi), preferably greater than about 860 MPa (125 ksi), and more preferably greater than about 900 MPa (130 ksi), (iii) superior weldability, (iv) substantially uniform through-thickness microstructure and properties, and (v) improved toughness over standard, commercially available, high-strength, low-alloy steels. These steels can have a tensile strength of greater than about 930 MPa (135 ksi), or greater than about 965 MPa (140 ksi), or greater than about 1000 MPa (145 ksi).

Steel Example

As discussed above, U.S. Pat. No. 6,248,191 entitled "METHOD FOR PRODUCING ULTRA-HIGH STRENGTH, WELDABLE STEELS WITH SUPERIOR TOUGHNESS", and corresponding International Publication WO 99/05328, each provide a description of steels suitable for use in the present invention. A method is provided for preparing an ultra-high strength steel plate. A steel slab is processed by: heating the slab to a substantially uniform temperature sufficient to dissolve substantially all carbides and carbonitrides of vanadium and niobium, preferably in the range of about 1000° C. to about 1250° C. (about 1832° F. to about 2282° F.), and more preferably in the range of about 1050° C. to about 1150° C. (about 1922° F. to about 2102° F.); a first hot rolling of the slab to a reduction of preferably about 20% to about 60% (in thickness) to form plate in one or more passes within a first temperature range in which austenite recrystallizes; a second hot rolling to a reduction of preferably about 40% to about 80% (in thickness) in one or more passes within a second temperature range, somewhat lower than the first temperature range, at which austenite does not recrystallize and above the $Ar_3$ transformation point; hardening the rolled plate by quenching at a rate of at least about 10° C./second (18° F./second), preferably at least about 20° C./second (36° F./second), more preferably at least about 30° C./second (54° F./second), and even more preferably at least about 35° C./second (63° F./second), from a temperature no lower than the $Ar_3$ transformation point to a Quench Stop Temperature (QST) at least as low as the $Ar_1$ transformation point, preferably in the range of about 550° C. to about 150° C. (about 1022° F. to about 302° F.), and more preferably in the range of about 500° C. to about 150° C. (about 932° F. to about 302° F.), and stopping the quenching and allowing the steel plate to air cool to ambient temperature, so as to facilitate completion of transformation of the steel to predominantly fine-grained lower bainite, fine-grained lath martensite, or mixtures thereof. As is understood by those skilled in the art, as used herein "percent reduction in thickness" refers to percent reduction in the thickness of the steel slab or plate prior to the reduction referenced. For purposes of example only, without thereby limiting this invention, a steel slab of about 25.4 cm (10 inches) may be reduced about 50% (a 50 percent reduction), in a first temperature range, to a thickness of about 12.7 cm (5 inches) then reduced about 80% (an 80 percent reduction), in a second temperature range, to a thickness of about 2.54 cm (1 inch).

The preferred steel product has a substantially uniform microstructure preferably comprising predominantly fine-grained lower bainite, fine-grained lath martensite, or mixtures thereof. Preferably, the fine-grained lath martensite comprises auto-tempered fine-grained lath martensite. As used in describing the present invention, and in the claims, "predominantly" means at least about 50 volume percent. The remainder of the microstructure can comprise additional fine-grained lower bainite, additional fine-grained lath martensite, upper bainite, or ferrite. More preferably, the microstructure comprises at least about 60 volume percent to about 80 volume percent fine-grained lower bainite, fine-grained lath martensite, or mixtures thereof. Even more preferably, the microstructure comprises at least about 90 volume percent fine-grained lower bainite, fine-grained lath martensite, or mixtures thereof.

Both the lower bainite and the lath martensite may be additionally hardened by precipitates of the carbides or carbonitrides of vanadium, niobium and molybdenum. These precipitates, especially those containing vanadium, can assist in minimizing HAZ softening, likely by preventing any substantial reduction of dislocation density in regions heated to temperatures no higher than the $Ac_1$ transformation point or by inducing precipitation hardening in regions heated to temperatures above the $Ac_1$ transformation point, or both.

The steel plate of this example is manufactured by preparing a steel slab in a customary fashion and, in one embodiment, comprising iron and the following alloying elements in the weight percents indicated:

0.03–0.10% carbon (C), preferably 0.05–0.09% C

0–0.6% silicon (Si)

1.6–2.1% manganese (Mn)

0–1.0% copper (Cu)

0–1.0% nickel (Ni), preferably 0.2 to 1.0% Ni 0.01–0.10% niobium (Nb), preferably 0.03–0.06% Nb 0.01–0.10% vanadium (V), preferably 0.03–0.08% V 0.3–0.6% molybdenum (Mo)

0–1.0% chromium (Cr)

0.005–0.03% titanium (Ti), preferably 0.015–0.02% Ti

0–0.06% aluminum (Al), preferably 0.001–0.06% Al

0–0.006% calcium (Ca)

0–0.02% Rare Earth Metals (REM)

0–0.006% magnesium (Mg)

and further characterized by:

Ceq≦0.7, and

Pcm≦0.35,

Alternatively, the chemistry set forth above is modified and includes 0.0005–0.0020 wt % boron (B), preferably 0.0008–0.0012 wt % B, and the Mo content is 0.2–0.5 wt %. For essentially boron-free steels, Ceq is preferably greater than about 0.5 and less than about 0.7. For boron-containing steels, Ceq is preferably greater than about 0.3 and less than about 0.7.

Additionally, the well-known impurities nitrogen (N), phosphorous (P), and sulfur (S) are preferably minimized in the steel, even though some N is desired, as explained below, for providing grain growth-inhibiting titanium nitride particles. Preferably, the N concentration is about 0.001 to about 0.006 wt %, the S concentration no more than about 0.005 wt %, more preferably no more than about 0.002 wt %, and the P concentration no more than about 0.015 wt %. In this chemistry the steel either is essentially boron-free in that there is no added boron, and the boron concentration is preferably less than about 3 ppm, more preferably less than about 1 ppm, or the steel contains added boron as stated above.

A preferred method for producing this ultra-high strength steel having a microstructure comprising predominantly fine-grained lower bainite, fine-grained lath martensite, or mixtures thereof, comprises heating a steel slab to a temperature sufficient to dissolve substantially all carbides and carbonitrides of vanadium and niobium; reducing the slab to form plate in one or more hot rolling passes in a first temperature range in which austenite recrystallizes; further reducing the plate in one or more hot rolling passes in a second temperature range below the $T_{nr}$ temperature, i.e., the temperature below which austenite does not recrystallize, and above the $Ar_3$ transformation point, i.e., the temperature at which austenite begins to transform to ferrite during cooling; quenching the finished rolled plate to a temperature at least as low as the $Ar_1$ transformation point, i.e., the temperature at which transformation of austenite to ferrite or to ferrite plus cementite is completed during cooling, preferably to a temperature between about 550° C. and about 150° C. (1022° F.–302° F.), and more preferably to a temperature between about 500° C. and about 150° C. (932° F.–302° F.); stopping the quenching; and air cooling the quenched plate to ambient temperature.

Other suitable steels for use in connection with the present invention are described in other publications that describe ultra-high strength, low alloy steels containing less than about 1 wt % nickel, having tensile strengths greater than 900 MPa (130 ksi), and having adequate fracture toughness for use at temperatures down to −40° C. (−40° F.). For example, such steels are described in PCT International Publication Number WO 96/23909 having a PCT Publication date of Aug. 8, 1996 (such steels preferably having a copper content of 0.1 wt % to 1.2 wt %), and in PCT International Publication Number WO 96/23083 having a PCT Publication date of Aug. 1, 1996.

For any of the above-referenced steels, as is understood by those skilled in the art, the $T_{nr}$ temperature depends on the chemistry of the steel, and more particularly, on the slab heating temperature before rolling, the carbon concentration, the niobium concentration and the amount of reduction given in the rolling passes. Persons skilled in the art may determine this temperature for each steel composition either by experiment or by model calculation. Likewise, the $Ac_1$, $Ar_1$, and $Ar_3$ transformation points referenced herein may be determined by persons skilled in the art for each steel composition either by experiment or by model calculation.

For any of the above-referenced steels, as is understood by those skilled in the art, except for the slab heating temperature before rolling, which applies to substantially the entire slab, subsequent temperatures referenced in describing the processing methods of this invention are temperatures measured at the surface of the steel. The surface temperature of steel can be measured by use of an optical pyrometer, for example, or by any other device suitable for measuring the surface temperature of steel. The cooling rates referred to herein are those at the center, or substantially at the center, of the plate thickness; and the Quench Stop Temperature (QST) is the highest, or substantially the highest, temperature reached at the surface of the plate, after quenching is stopped, because of heat transmitted from the mid-thickness of the plate. For example, during processing of experimental heats of a steel composition according to the examples provided herein, a thermocouple is placed at the center, or substantially at the center, of the steel plate thickness for center temperature measurement, while the surface temperature is measured by use of an optical pyrometer. A correlation between center temperature and surface temperature is developed for use during subsequent processing of the same, or substantially the same, steel composition, such that center temperature may be determined via direct measurement of surface temperature. Also, the required temperature and flow rate of the quenching fluid to accomplish the desired accelerated cooling rate may be determined by one skilled in the art by reference to standard industry publications.

A person of skill in the art has the requisite knowledge and skill to use the information provided herein to produce ultra-high strength, low alloy steel plates having suitable high strength for use in constructing the marine structural members and other components of the present invention. Additionally, a person of skill in the art has the requisite knowledge and skill to use the information provided herein to produce ultra-high strength, low alloy steel plates having the required combinations of strength and fracture toughness for use in arctic environments. Other suitable steels may exist or be developed hereafter. All such steels are within the scope of this invention.

Joining Methods for Construction of Marine Structures

In order to construct marine structural members and other components of the present invention, a suitable method of joining the steel plates is required. Any joining method that will provide joints or seams with adequate strength and toughness for the present invention, as discussed above, is considered to be suitable. Preferably, a welding method suitable for providing adequate strength and fracture toughness is used to construct the marine structural members and other components of the present invention. Such a welding method preferably includes a suitable consumable wire, a suitable consumable gas, a suitable welding process, and a suitable welding procedure. For example, both gas metal arc welding (GMAW) and tungsten inert gas (TIG) welding, which are both well known in the steel fabrication industry, can be used to join the steel plates, provided that a suitable consumable wire-gas combination is used.

In a first example welding method, the gas metal arc welding (GMAW) process is used to produce a weld metal chemistry comprising iron and about 0.07 wt % carbon, about 2.05 wt % manganese, about 0.32 wt % silicon, about 2.20 wt % nickel, about 0.45 wt % chromium, about 0.56 wt % molybdenum, less than about 110 ppm phosphorous, and less than about 50 ppm sulfur. The weld is made on a steel, such as any of the above-described steels, using an argon-based shielding gas with less than about 1 wt % oxygen. The welding heat input is in the range of about 0.3 kJ/mm to about 1.5 kJ/mm (7.6 kJ/inch to 38 kJ/inch). Welding by this method provides a weldment (see Glossary) having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

In another example welding method, the GMAW process is used to produce a weld metal chemistry comprising iron and about 0.10 wt % carbon (preferably less than about 0.10 wt % carbon, more preferably from about 0.07 to about 0.08 wt % carbon), about 1.60 wt % manganese, about 0.25 wt % silicon, about 1.87 wt % nickel, about 0.87 wt % chromium, about 0.51 wt % molybdenum, less than about 75 ppm phosphorous, and less than about 100 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as any of the above-described steels, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

In another example welding method, the tungsten inert gas welding (TIG) process is used to produce a weld metal chemistry containing iron and about 0.07 wt % carbon (preferably less than about 0.07 wt % carbon), about 1.80 wt % manganese, about 0.20 wt % silicon, about 4.00 wt % nickel, about 0.5 wt % chromium, about 0.40 wt % molybdenum, about 0.02 wt % copper, about 0.02 wt % aluminum, about 0.010 wt % titanium, about 0.015 wt % zirconium (Zr), less than about 50 ppm phosphorous, and less than about 30 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as any of the above-described steels, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

Similar weld metal chemistries to those mentioned in the examples can be made using either the GMAW or the TIG welding processes. However, the TIG welds are anticipated to have lower impurity content and a more highly refined microstructure than the GMAW welds, and thus improved low temperature toughness. Also, as will be familiar to those skilled in the art, one may use GTAW, SMAW, SAW, and FCAW. Other useful welding information is described in U.S. Publication No. 2002/0043305, based on U.S. application Ser. No. 09/920894, entitled "Weld Metals with Superior Low Temperature Toughness for Joining High Strength, Low Alloy Steels", and in issued U.S. Pat. No. 5,523,540, entitled "Welding Electrodes for Producing Low Carbon Bainitic Ferrite Weld Deposits", both of which are hereby incorporated herein by reference.

A person of skill in the art has the requisite knowledge and skill to use the information provided herein to weld ultra-high strength, low alloy steel plates to produce joints or seams having suitable high strength and fracture toughness for use in constructing the marine structural members and other components of the present invention. Other suitable joining or welding methods may exist or be developed hereafter. All such joining or welding methods are within the scope of the present invention.

Construction of Marine Structures

Marine structures that are constructed from ultra-high strength, low alloy steels containing less than 2.5 wt % nickel and having a tensile strength greater than 900 MPa (130 ksi) are provided. The marine structures of this invention may be constructed from discrete plates of the ultra-high strength, low alloy steel. An added benefit of this invention is that marine structures according to this invention have adequate fracture toughness for use in arctic environments. The joints or seams of the marine structures preferably have about the same strength and fracture toughness as the ultra-high strength, low alloy steel plates. In some cases, an undermatching of the strength on the order of about 5% to about 10% may be justified for locations of lower stress. Joints or seams with the preferred properties can be made by any suitable joining technique. An exemplary joining technique is described herein, under the subheading "Joining Methods for Construction of Marine Structures".

As will be familiar to those skilled in the art, the operating conditions taken into consideration in the design of structures constructed from a welded steel with potential for use in arctic environments, i.e., at temperatures down to −40° C. (−40° F.), include among other things, the operating temperature, any pressures, such as fluid pressures, to which the structure will be subjected, as well as additional stresses that are likely to be imposed on the steel and the weldments. Standard fracture mechanics measurements, such as (i) critical stress intensity factor ($K_{IC}$), which is a measurement of plane-strain fracture toughness, and (ii) crack tip opening displacement (CTOD), which can be used to measure elastic-plastic fracture toughness, both of which are familiar to those skilled in the art, may be used to determine the fracture toughness of the steel and the weldments. Industry codes generally acceptable for steel structure design, for example, as presented in the BSI publication "Guidance on methods for assessing the acceptability of flaws in fusion welded structures", often referred to as "BS7910:1999", may be used to determine the maximum allowable flaw sizes for the structures based on the fracture toughness of the steel and weldment (including HAZ) and the imposed stresses on the structure. A person skilled in the art can develop a fracture control program to mitigate fracture initiation through (i) appropriate structure design to minimize imposed stresses, (ii) appropriate manufacturing quality control to minimize defects, (iii) appropriate control of life cycle loads and pressures applied to the structure, and (iv) an appropriate inspection program to reliably detect flaws and defects in the structure. A preferred design philosophy for storage containers welded according to the present invention is "leak before failure", as is familiar to those skilled in the art. These considerations are generally referred to herein as "known principles of fracture mechanics."

The following is a non-limiting example of application of these known principles of fracture mechanics in a procedure for calculating critical flaw depth for a given flaw length for use in a fracture control plan to prevent fracture initiation in a pressure vessel or container.

Figure 6A:
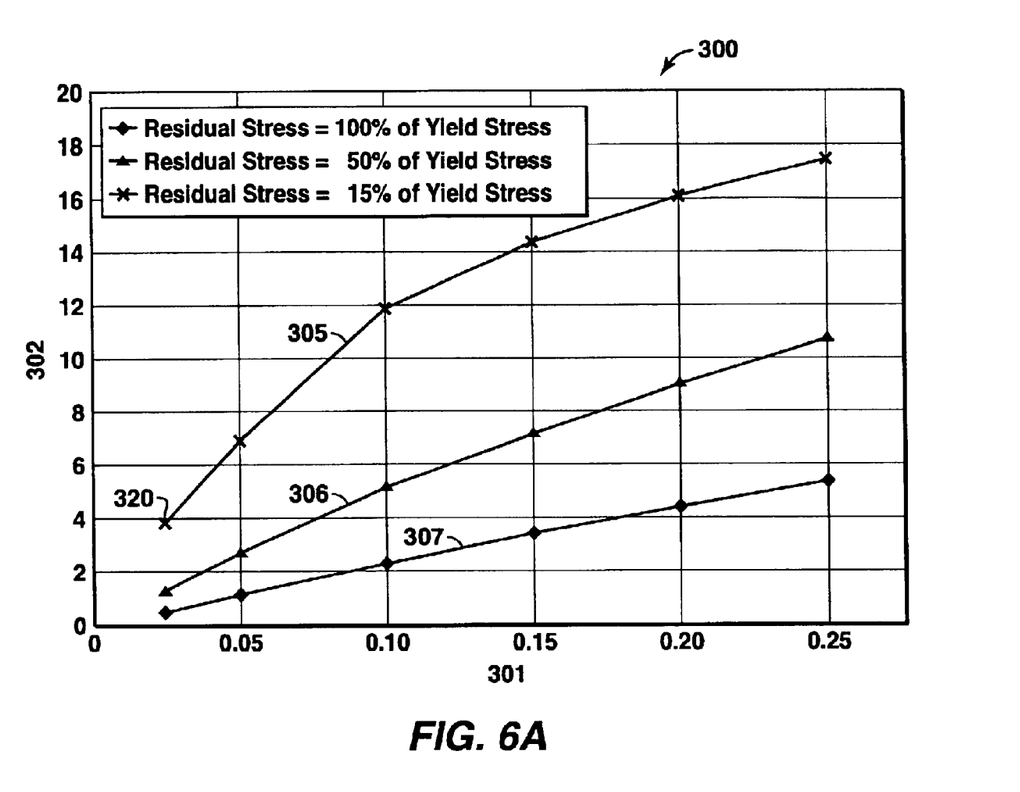
FIG. 6A illustrates a plot of critical flaw depth, for a given flaw length, as a function of CTOD fracture toughness and of residual stress.
Figure 6B:
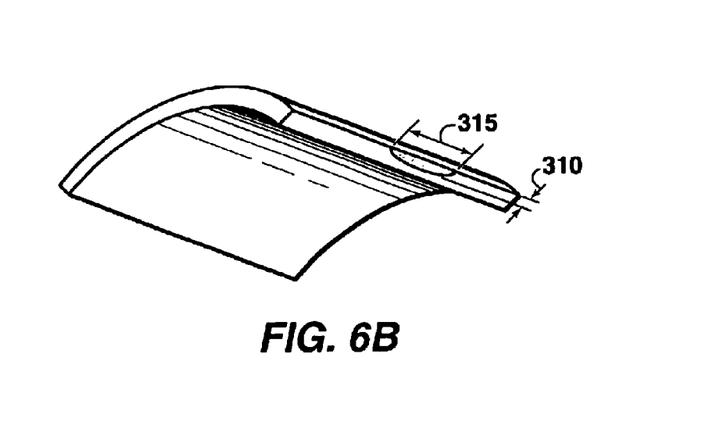
FIG. 6B illustrates the geometry (length and depth) of a flaw.

FIG. 6B illustrates a flaw of flaw length 315 and flaw depth 310. BS7910:1999 is used to calculate values for the critical flaw size plot 300 shown in FIG. 6A based on the following design conditions:

| | |
|---|---|
| Vessel Diameter: | 4.57 m (15 ft) |
| Vessel Wall Thickness: | 25.4 mm (1.00 in.) |
| Design Pressure: | 3445 kPa (500 psi) |
| Allowable Hoop Stress: | 333 MPa (48.3 ksi). |

For the purpose of this example, a surface flaw length of 100 mm (4 inches), e.g., an axial flaw located in a seam weld, is assumed. Referring now to FIG. 6A, plot 300 shows the value for critical flaw depth (axis 302) as a function of CTOD fracture toughness (axis 301) and of residual stress, for residual stress levels of 15 percent of yield stress (line 305), 50 percent of yield stress (line 306), and 100 percent of yield stress (line 307). Residual stresses can be generated due to fabrication and welding; and BS7910:1999 recommends the use of a residual stress value of 100 percent of yield stress in welds (including the weld HAZ) unless the welds are stress relieved using techniques such as post weld heat treatment (PWHT) or mechanical stress relief.

Based on the CTOD fracture toughness of the pressure vessel steel at the minimum service temperature, the vessel fabrication can be adjusted to reduce the residual stresses and an inspection program can be implemented (for both initial inspection and in-service inspection) to detect and measure flaws for comparison against critical flaw size. In this example, if the steel has a CTOD toughness of 0.025 mm at the minimum service temperature (as measured using laboratory specimens) and the residual stresses are reduced to 15 percent of the steel yield strength, then the value for critical flaw depth is approximately 4 mm (see point 320 on FIG. 6A). Following similar calculation procedures, as are well known to those skilled in the art, critical flaw depths can be determined for various flaw lengths as well as various flaw geometries. Using this information, a quality control program and inspection program (techniques, detectable flaw dimensions, frequency) can be developed to ensure that flaws are detected and remedied prior to reaching the critical flaw depth or prior to the application of the design loads. Based on published empirical correlations between CVN, $K_{IC}$ and CTOD fracture toughness, the 0.025 mm CTOD toughness generally correlates to a CVN value of about 37 J. This example is not intended to limit this invention in any way.

For marine structures that require bending of the steel, e.g., into a cylindrical shape for a container or into a tubular shape for a pipe, the steel is preferably bent into the desired shape at ambient temperature in order to avoid detrimentally affecting the properties of the steel. If the steel must be heated to achieve the desired shape after bending, the steel is preferably heated to a temperature no higher than about 600° C. (1112° F.) in order to preserve the beneficial effects of the steel microstructure as described above.

Marine Structures

Marine structures constructed from materials comprising an ultra-high strength, low alloy steel containing less than 2.5 wt % nickel and having a tensile strength greater than 900 MPa (130 ksi) are provided. Preferably, the ultra-high strength, low alloy steel has adequate fracture toughness in the base plate, and in the heat affected zone (HAZ) when welded, for use in arctic environments, i.e., at temperatures down to −40° C. (−40° F.).

Marine structures according to this invention can be advantageously used, for example, in the construction of offshore platforms for production of hydrocarbons, such as deep draft caisson vessels. Additionally, ultra-high strength, low alloy steels, as described herein, can be used for construction of processing equipment used on offshore platforms for containing hydrocarbons and/or other fluids used during the processing. Other marine structures, such as dams, seawalls, retaining walls, ship hulls, and submarine hulls, can also be constructed according to this invention. Without thereby limiting this invention, particular marine structures constructed according to this invention are described in greater detail below.

Offshore Platform Structures

Structural members of offshore platforms, constructed according to this invention, are provided. Without thereby limiting this invention, the following examples illustrate various components of offshore platforms according to this invention. As used herein, the term "structural member" means any individual member that is joined with any other member or members to form a structure.

EXAMPLE NO. 1

Figure 2:
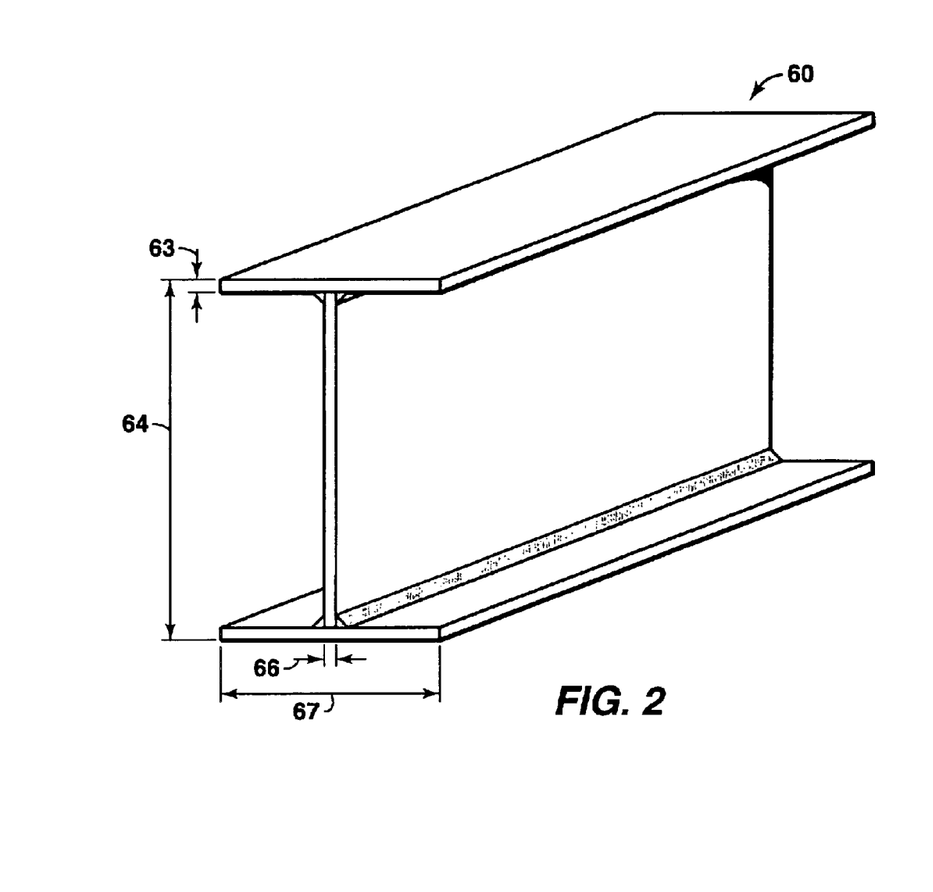
FIG. 2 illustrates an I-beam structural member made from plate steel for an offshore structure.

In a first example, topside structural members such as I-beams can be built up from flat plate steel. The I-shaped plate girders, hereafter referred to as I-beams, created using ultra-high strength, low alloy steels described herein would be smaller and lighter than I-beams made from conventional construction members used for offshore structures. Referring now to FIG. 2, for example, an I-beam 60 with a height 64 of 274.3 cm (108 inch), a flange width 67 of 152.4 cm (60 inch), a flange thickness 63 of 6.35 cm (2.5 inch), and a web thickness 66 of 6.35 cm (2.5 inch) could be replaced by an I-beam 60 with a height 64 of 243.8 cm (96 inch), a flange width 67 of 91.4 cm (36 inch), a flange thickness 63 of 6.35 cm (2.5 inch), and a web thickness 66 of 3.81 cm (1.5 inch), while still maintaining the original design parameters of allowable stress, buckling, and deflection. The weight per unit length for the conventional design would be 2823 kg/m (1897 lb/ft) while the design enabled by the ultra-high strength, low allow steels of this invention would be 1603 kg/m (1077 lb/ft).

EXAMPLE NO. 2

Figure 3:
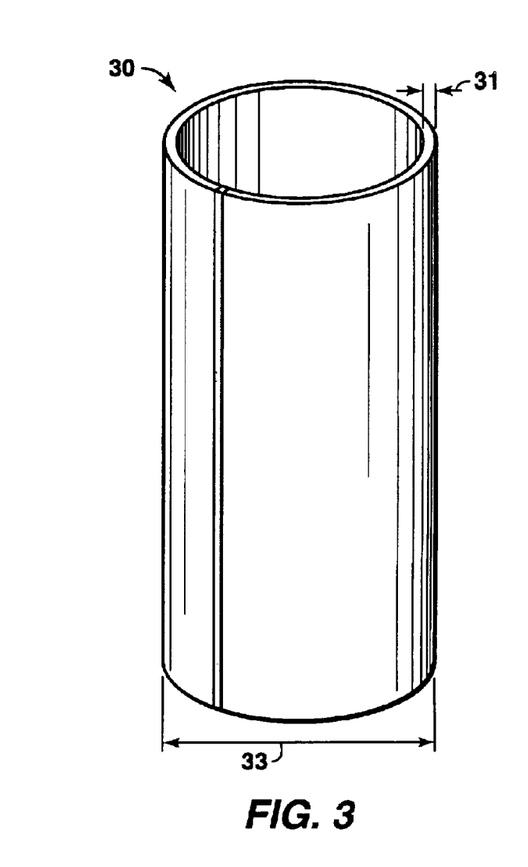
FIG. 3 illustrates a tubular structural member made from plate steel for an offshore structure

In a second example, an offshore platform topside tubular structural member can also be built up from plate material. Tubular structures constructed of ultra-high strength, low alloy steels described herein would be smaller in diameter and lighter than tubulars made from traditional construction steel. For example, referring now to FIG. 3, a tubular member 30 with an outside diameter 33 of 304.8 cm (120 inches) and a wall thickness 31 of 3.81 cm (1.5 inch) could be replaced by a tubular member 30 with an outside diameter 33 of 228.6 cm (90 inches) and a wall thickness 31 of 3.18 cm (1.25 inch), while still maintaining the original design parameters of allowable stress, buckling, and deflection. The weight per unit length for the conventional design would be 2832 kg/m (1903 lb/ft) while the design enabled by this invention would be have a weight per unit length of 1765 kg/m (1186 lb/ft). Also, savings of 76.2 cm (30 inches) on the outside diameter 33 of the tubular member 30 would have benefit in the overall design and safety of the structure by allowing either a smaller platform to be built, or by allowing more room for passage between the structural member and the neighboring equipment.

By replacing structural members on the structure above the water line of a large platform, for example without limiting this invention, tubular and I-beam structural members, weight savings on the order of 2722 to 3629 tonnes (3000 to 4000 short tons) can be obtained for large offshore platform topsides found on a deep draft caisson vessels ("DDCV"). Weight savings can also be achieved by replacing other structural members such as, without limitation, I-beam, tubular, channel, box, box beam, box girders, angle, bracket, L-shaped member, T-shaped member, gusset, plate, decking, blast wall, and other structural shapes, as will be familiar to those skilled in the art. These topsides weight savings would then enable the use of a smaller DDCV hull size and smaller mooring chains. This lighter DDCV would then be easier and cheaper to install. As well as making the DDCV lighter by use of ultra-high strength, low alloy steels, the structure can also become smaller overall. Another benefit of using the steels described herein is that these steels can be fabricated in longer lengths than conventional steels; thus, structural members, or sections thereof, constructed from these steels can be longer than those constructed from conventional steels, and a DDCV, for example, can be constructed with fewer welded joints and, therefore, more quickly than if conventional steel members were used.

The design criteria and method of construction of deep draft caisson vessels and other types of offshore platforms according to this invention are familiar to those skilled in the art, especially in view of the disclosure provided herein.

Processing Equipment

Components of processing equipment for use on offshore structures, constructed according to this invention, are provided. Without thereby limiting this invention, the following examples illustrate various components of processing equipment according to this invention.

EXAMPLE NO. 1

Figure 4A:
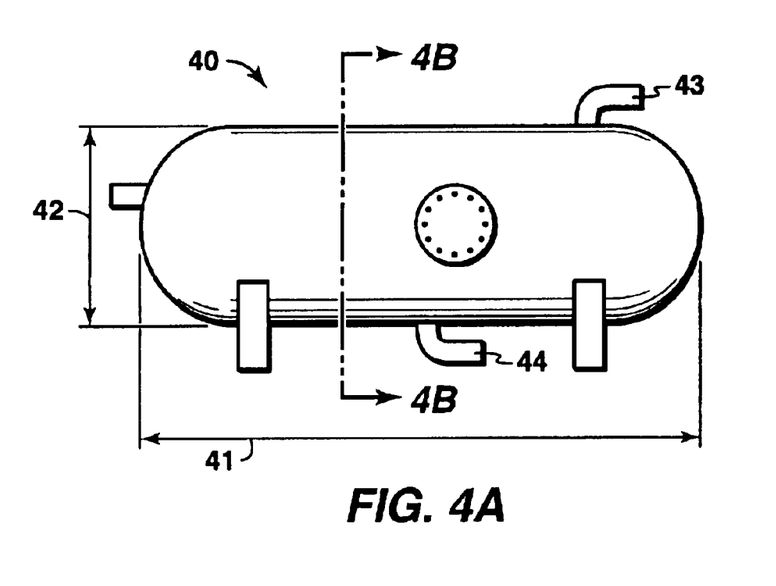
FIGS. 4A and 4B illustrate a pressure vessel designed to be used as a separator on an offshore platform.
Figure 4B:
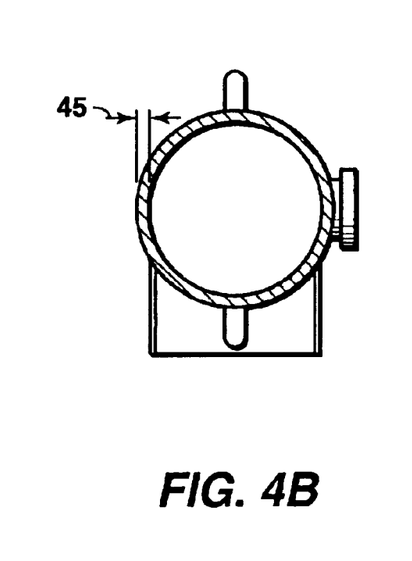

In a first example, referring now to FIGS. 4A and 4B, a container such as a large pressure vessel, e.g., for use as a high pressure separator 40 on a deep draft caisson vessel ("DDCV") is designed to withstand 907 MPa (1315 psig) and 149° C. (300° F.) and has gas outlet 43 and liquid outlet 44. The outside dimensions of high pressure separator 40 are a length 41 of 14 m (46 feet), and a diameter 42 of 3.3 m (10.8 feet). Using conventional pressure vessel steel, the wall thickness 45 of high pressure separator 40 has to be 10.8 cm (4.25 inches) in order to withstand the design conditions. The weight of high pressure separator 40 using conventional pressure vessel steel would be 131 tonnes (144 short tons). Using the ultra-high strength, low alloy steel as described herein allows high pressure separator 40 to be designed with a wall thickness 45 of 5.1 cm (2.0 inch) and a weight of 62.1 tonnes (68.5 short tons).

EXAMPLE NO. 2

Figure 5A:
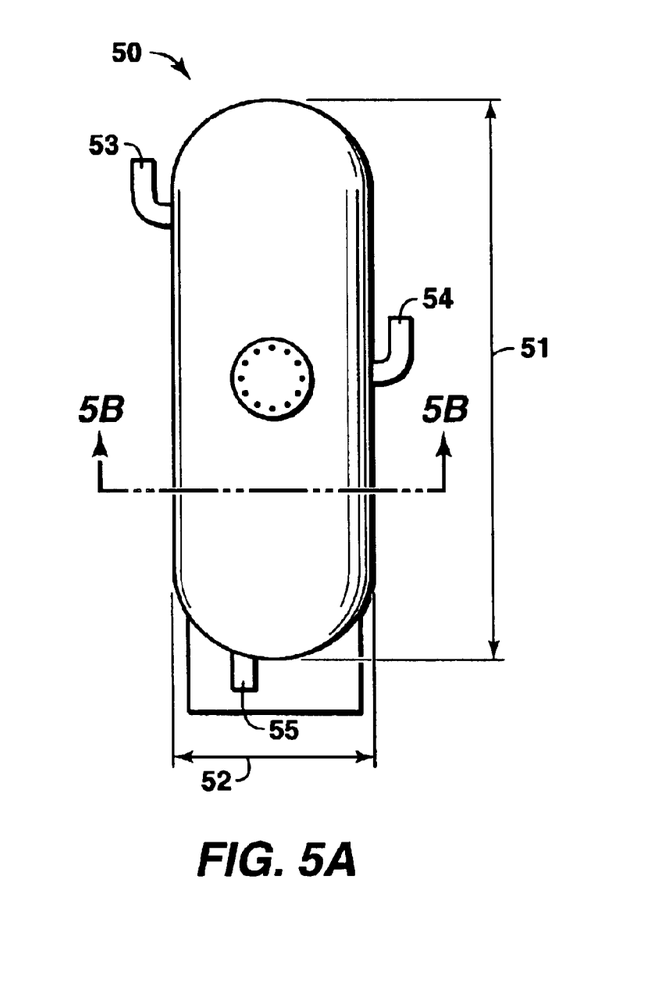
FIGS. 5A and 5B illustrate a pressure vessel designed to be used as a swab tank on an offshore platform.
Figure 5B:
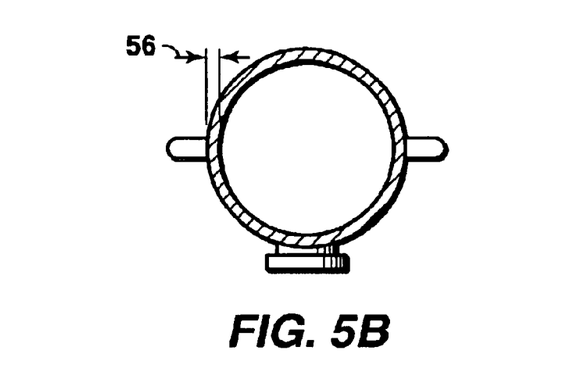

In a second example, referring now to FIGS. 5A and 5B, a container such as a pressure vessel, e.g., for use as a swab tank 50 on a deep draft caisson vessel ("DDCV") is designed to withstand 190 MPa (275 psig) and 149° C. (300° F.) and has gas inlet 53, gas outlet 54, and liquid outlet 55. The outside dimensions of swab tank 50 are a height 51 of approximately 11 m (36 feet), and a diameter 52 of approximately 3 m (10 feet). Using conventional pressure vessel steel, the wall thickness 56 of swab tank 50 has to be 2.5 cm (1 inch) in order to withstand the design conditions. The weight of swab tank 50 using conventional pressure vessel steel would be 28.1 tonnes (31 short tons). Using the ultra-high strength, low alloy steel as described herein allows swab tank 50 to be designed with a wall thickness 56 of 1.6 cm (0.625 inch) and have a weight of 19.8 tonnes (22 short tons).

The design criteria and method of construction of processing components according to this invention are familiar to those skilled in the art, especially in view of the disclosure provided herein.

Ship Structural Members

Ship structural members constructed according to this invention, for example without limiting this invention, ship hulls, are provided. The steels discussed herein can be advantageously used in the construction of military vessels or in high speed vessels where weight savings are especially important. Currently, military ships use ultra-high strength quench and tempered steels for parts where the strength requirements (typically to resist penetration) are large. The steels proposed herein have lower per-ton costs, have greater resistance to fracture initiation, and can be welded more easily than the steels used currently.

The design criteria and method of construction of a ship structural members according to this invention are familiar to those skilled in the art, especially in view of the disclosure provided herein.

Submarine Vessel Structural Members

Submarine vessel structural members constructed according to this invention, for example without limiting this invention, submarine vessel hulls, are provided. Military submarines use large quantities of ultra-high strength quench and tempered steels for the hulls of submarines. The steels described herein are easier to weld and have lower per-ton and per unit strength costs that the steels used currently. The steels described herein can also be used to make submarine vessels, or structural members thereof, such as would be used for processing hydrocarbons on the sea bed.

The design criteria and method of construction of a submarine hull according to this invention are familiar to those skilled in the art, especially in view of the disclosure provided herein.

While this invention has been described in terms of one or more preferred embodiments, it should be understood that other modifications may be made without departing from the scope of the invention, which is set forth in the claims below.

GLOSSARY OF TERMS $Ac_1$ transformation point: the temperature at which austenite begins to form during heating;

$Ar_1$ transformation point: the temperature at which transformation of austenite to ferrite or to ferrite plus cementite is completed during cooling;

$Ar_3$ transformation point: the temperature at which austenite begins to transform to ferrite during cooling;

arctic environment: temperatures down to −40° C. (−40° F.);

cooling rate: cooling rate at the center, or substantially at the center, of the plate thickness;

CTOD: crack tip opening displacement;

DBTT (Ductile to Brittle Transition Temperature): delineates the two fracture regimes in structural steels; at temperatures below the DBTT, failure tends to occur by low energy cleavage (brittle) fracture, while at temperatures above the DBTT, failure tends to occur by high energy ductile fracture;

FCAW: flux-cored arc welding;

GMAW: gas metal arc welding;

GTAW: gas tungsten arc welding;

HAZ: heat affected zone;

J: joules;

$J_C$: a measure of plane strain fracture toughness (ASTME 1823);

$K_{IC}$: a measure of plane strain fracture toughness (ASTME 1823);

kJ: kilojoule;

low alloy steel: a steel containing iron and less than about 10 wt % total alloy additives;

marine structure: any structure intended for use in or above the surface of water;

maximum allowable flaw size: critical flaw length and depth;

Pcm: a well-known industry term used to express weldability; also, Pcm=(wt % C+wt % Si/30+(wt % Mn+wt % Cu+wt % Cr)/20+wt % Ni/60+wt % Mo/15+wt % V/10+5 (wt % B));

ppm: parts-per-million;

predominantly: at least about 50 volume percent;

quenching: accelerated cooling by any means whereby a fluid selected for its tendency to increase the cooling rate of the steel is utilized, as opposed to air cooling;

Quench Stop Temperature: the highest, or substantially the highest, temperature reached at the surface of the plate, after quenching is stopped, because of heat transmitted from the mid-thickness of the plate;

QST: Quench Stop Temperature;

SAW: submerged arc welding;

SMAW: shielded metal arc welding;

slab: a piece of steel having any dimensions;

structural member: any individual member that is joined with any other member or members to form a structure;

tensile strength: in tensile testing, the ratio of maximum load to original cross-sectional area;

TIG welding: tungsten inert gas welding;

$T_{nr}$ temperature: the temperature below which austenite does not recrystallize;

USPTO: United States Patent and Trademark Office;

weld metal: the welding consumable wire (and flux, if used) as deposited and diluted by the portion of the base metal that melts during performance of the welding process or that portion of a weldment that was rendered molten during the welding operation; this volume of material is a mixture of the base metal and the welding consumables; and weldment: a welded joint, including: (i) the weld metal, (ii) the heat-affected zone (HAZ), and (iii) the base metal in the "near vicinity" of the HAZ. The portion of the base metal that is considered within the "near vicinity" of the HAZ, and therefore, a part of the weldment, varies depending on factors known to those skilled in the art, for example, without limitation, the width of the weldment, the size of the item that was welded, the number of weldments required to fabricate the item, and the distance between weldments.

We claim:

1. A method of producing hydrocarbons, said method comprising the step of using an offshore structure to facilitate production of said hydrocarbons, wherein said offshore structure supports at least one container suitable for containing a fluid used in either the production or processing of said hydrocarbons, said container having been constructed from materials comprising an ultra-high strength, low alloy steel containing less than 2.5 wt % nickel and having a tensile strength of at least about 900 MPa (130 ksi).

2. A method of producing hydrocarbons, said method comprising the step of using an offshore structure to facilitate production of said hydrocarbons, wherein said offshore structure comprises at least one structural member, said at least one structural member having been constructed from materials comprising an ultra-high strength, low alloy steel containing less than 2.5 wt % nickel and having a tensile strength of at least about 900 MPa (130 ksi).

3. A method of producing hydrocarbons, said method comprising the step of using an offshore structure to facilitate production of said hydrocarbons, wherein said offshore structure comprises at least one structural member selected from the group consisting of an I-beam, a tubular, a channel, a box, a box beam, a box girder, an angle, a bracket, an L-shaped member, a T-shaped member, a gusset, a plate, decking, and a blast wall, said at least one structural member having been constructed from materials comprising an ultra-high strength, low alloy steel containing less than 2.5 wt % nickel and having a tensile strength of at least about 900 MPa (130 ksi).

* * * * *